US006823524B1

(12) United States Patent
Hewett

(10) Patent No.: US 6,823,524 B1
(45) Date of Patent: Nov. 23, 2004

(54) SYSTEM AND METHOD FOR MANAGING THE DISTRIBUTION OF EVENTS IN A DATA PROCESSING SYSTEM

(75) Inventor: Alan Perry Hewett, Pataskala, OH (US)

(73) Assignee: Avaya Technology Corp., Basking Ridge, NJ (US)

(*) Notice: Subject to any disclaimer, the term of this patent is extended or adjusted under 35 U.S.C. 154(b) by 0 days.

(21) Appl. No.: 09/417,355

(22) Filed: Oct. 13, 1999

(51) Int. Cl.[7] .................................................. G06F 9/46
(52) U.S. Cl. ...................... 719/318; 718/103; 718/104; 718/106; 718/107; 718/108
(58) Field of Search ................................ 709/313–318, 709/100–108; 710/260–269; 379/200–219, 242–258; 718/103, 104, 106, 107; 719/318

(56) References Cited

U.S. PATENT DOCUMENTS

| 5,652,789 A | * | 7/1997 | Miner et al. ................. 379/201 |
| 5,951,648 A | * | 9/1999 | Kailash ....................... 709/237 |
| 5,961,584 A | * | 10/1999 | Wolf .......................... 709/103 |
| 6,363,435 B1 | * | 3/2002 | Fernando et al. ............ 709/318 |

OTHER PUBLICATIONS

Kleindienst Jan "The BeanChannel: Java distributed event model Ph. D. Thesis" 1998 Waston Research Group pp. 65–109.*
Kleindienst Jan "The BeanChannel: Java distributed event model" Jul. 1998 Waston Research Group pp. 0–15.*
"comp.programming.threads FAQ", http://www.faqs.org/faqs/threads-faq/part1, (May 24, 1997), 16 pp.
"Thread (computer science)", Wikipedia, http://en2.wikipedia.org/wiki/thread+(computer+science), 2 pp.

* cited by examiner

Primary Examiner—Meng-Al T. An
Assistant Examiner—Charles Anya
(74) Attorney, Agent, or Firm—David Volejnicek

(57) ABSTRACT

A system and method are disclosed for distributing events in a data processing system from an event generator to an event recipient, while retaining processing control at the event generator. A manager object is created to manage the event generator's event calls. In response to an event, a distributor object is created and assigned a new thread of execution. When multiple event recipients exist, a slave object is created for each recipient, with each slave assigned to a new thread of execution. The slave object distributes the event by calling an interface method that is created as part of the event generator.

29 Claims, 4 Drawing Sheets

SYSTEM AND METHOD FOR MANAGING THE DISTRIBUTION OF EVENTS IN A DATA PROCESSING SYSTEM

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

This invention relates to the distribution of events between an event generator object and one or more listener (recipient) objects within a data processing system, and particularly an object oriented data processing system.

2. Description of the Prior Art

In a data processing system, and particularly an object oriented data processing system implemented using the Java programming language, the C++ programming language, and others, events can be used to pass control from an event generator object to a listener object. Although control passes in one direction only, stack implementation of event constructs requires an implicit return to the event generator object at some point. This requirement for an implicit return is particularly true when more than one object is listening for an event. If the return to the event generator object is not done in a timely fashion, distribution of events may take place too late or not at all. It is also possible for the stack space to be exhausted while an event-passing task is being performed repeatedly.

By way of example, in an automated call processing center for a business or other enterprise, an incoming call may be processed by a call answering object that distributes call-related events to other call handling objects, such as an announcement playing object, a prompt-and-collect object, and a call routing object. Consider an example wherein the call answering object receives a new call and, in accordance with its programming, distributes a newcall event to other call handling objects. Consider further that the caller subsequently hangs up after the new call event is distributed, but before control is returned to the call answering object. The call answering object is programmed to respond to the caller hang-up by generating a call terminating event, so that call processing by the recipient objects can be discontinued and call processing resources can be freed up for other calls. If the call answering object is waiting for a return of the new call event (or some other event) when the call hang-up occurs, it will not be able to generate the call terminating event in a timely fashion, if at all.

Accordingly, there is a need in a data processing environment for a system and method that coordinates the prompt distribution of events without impairing generator object processing functions and without depleting stack space in stack-based event processing implementations. What is needed is a system and method for distributing events from an event generator to an event recipient (listener) while retaining control at the event generator, such that the event generator is, among other things, free to continue generating subsequent events to event recipients.

SUMMARY OF THE INVENTION

A system and method in accordance with the invention solves the foregoing problem and provides for the distribution of an event from an event generator to an event recipient (listener) while retaining control at the event generator. In accordance with the inventive system and method, an event generator generates events while running in a first execution thread. The generator's events are then processed and distributed to one or more event recipients in one or more separate execution threads. In this way, the event generator is free to continue its processing functions, which may include generating subsequent events, without having to wait for processing of the initial event to complete.

In preferred embodiments of the invention, the event generator and event recipients are object oriented programming objects. The event generator object provides public methods that allow other objects to register and deregister themselves as event recipients for specified events. Event processing and distribution (as well as event recipient registration and deregistration) is handled by a manager object that is created to manage the event calls for the event generator object. When the event generator object generates an event, a distributor object is created and run on a new execution thread with a priority level higher than the execution thread on which the event generator object runs. The distributor object distributes the event to the appropriate event listener using the new thread, such that generator object processing may continue. Preferably, in order to accommodate multiple listeners, the distributor object generates a slave object for each event listener. Each slave object is assigned a new thread of execution with a priority equal to the priority of the event generator object's thread of execution and lower than the priority of the distributor's thread of execution, such that the distributor object can complete its functions before the slave objects begin distributing the event to the listener objects. The slave objects preferably distribute the event to the appropriate listeners by calling an interface created as part of the event generator object.

BRIEF DESCRIPTION OF THE DRAWING

The foregoing and other features and advantages of the invention will be apparent from the following more particular description of a preferred embodiment of the invention, as illustrated in the accompanying Drawing, in which.

DETAILED DESCRIPTION OF THE PREFERRED EMBODIMENT

Figure 1:
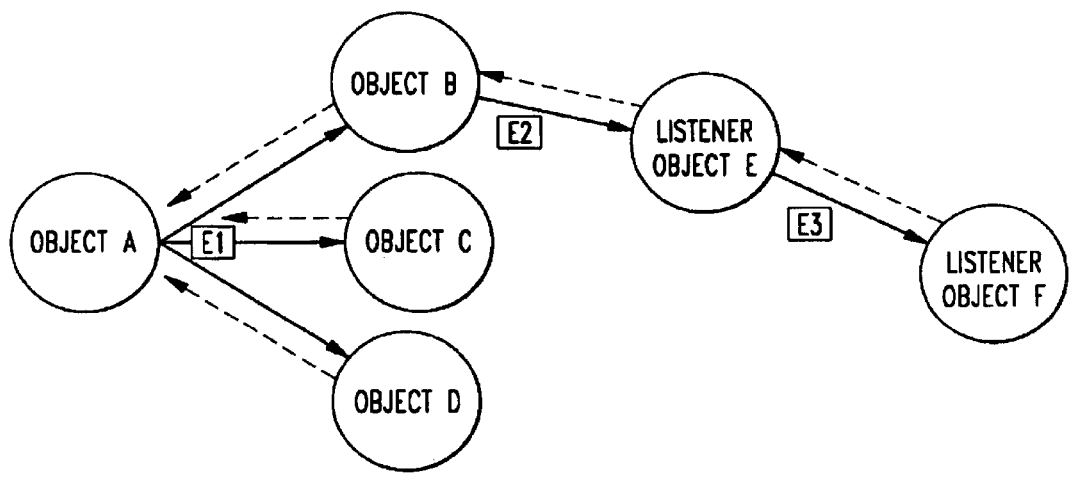
FIG. 1 is a block diagram showing a first scheme for distributing events among objects in a prior art data processing system.

Turning now to the figures, wherein like reference numerals represent like elements in all of the several views, FIG. 1 illustrates, by way of additional background, the prior art event processing scheme described above wherein events are passed from a generator object to one or more listener objects. More particularly, in the event distribution scheme shown in FIG. 1, objects A, B, C, D, E and F are part of an application in an object oriented data processing environment. Event E1 is generated by object A and passed to object B. Objects C and D do not receive notification of event E1 until object B returns. Object B generates event E2 and passes it to object E. Object E, in turn, generates event E3 and passes it to object F. Objects C and D are deprived of notification of event E1 until objects B, E and F are finished processing their respective events and return. If object A has tasks to complete after event E1, those tasks cannot be started until objects B, C and D complete their respective processing and return.

Figure 2:
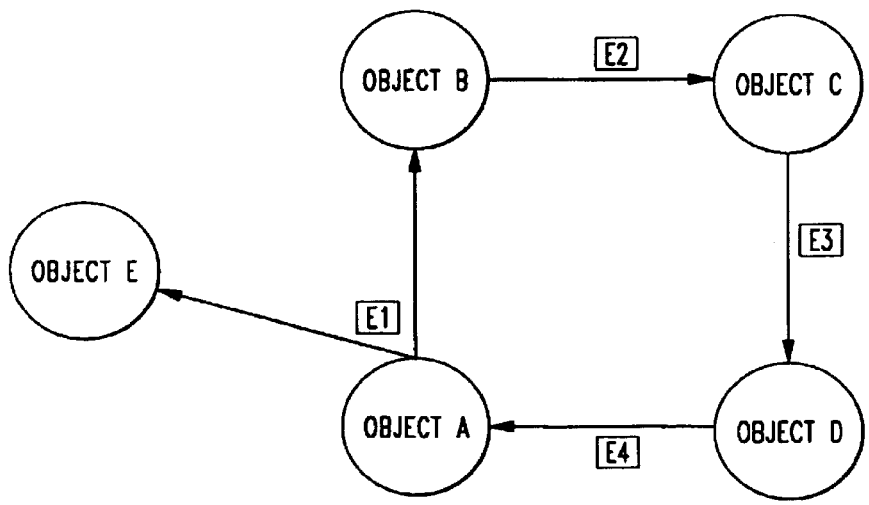
FIG. 2 is a block diagram showing a second scheme for distributing events among objects in a prior art data processing system.

In the event processing scheme shown in FIG. 2, object A generates event E1, which has listener objects B and E, and which is passed to object B before it is passed to object E. Object B generates event E2 that is passed to object C; object C generates event E3 that is passed to object D; and object D generates event E4 that is passed to object A. As such, the event passing between objects A, B, C and D completes a cycle. Because of this cycle, object E may never see event E1 and the stack that supports method calls may increase in size until it exceeds the limits of system resources, causing the application to crash.

Figure 3:
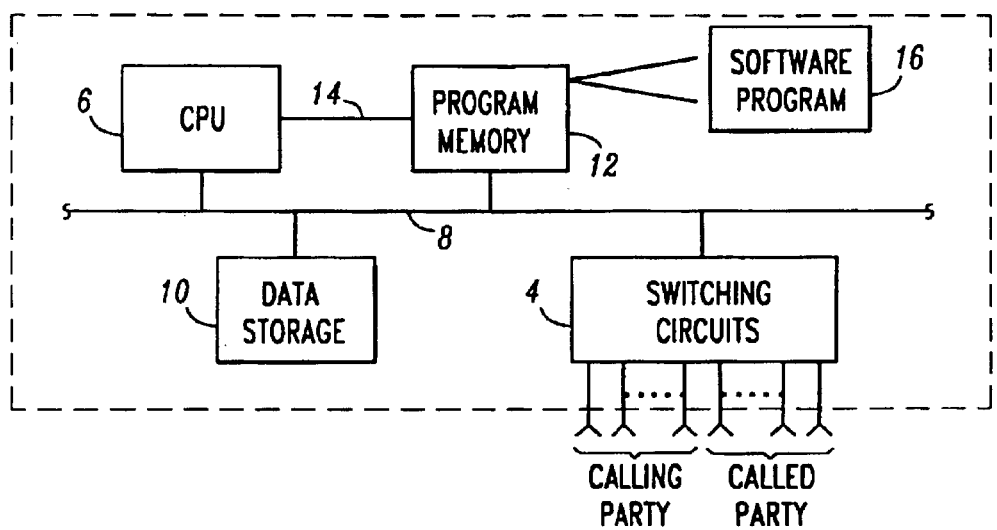
FIG. 3 is a block diagram showing a data processing system constructed in accordance with a preferred embodiment of the invention.

Turning now to FIG. 3, an exemplary data processing system 2 illustrates one possible implementation of the present invention in a telephone call processing center. As is known in the art, a call processing center provides automated call handling services in response to incoming calls to an enterprise such as a business, a governmental agency or other entity. As shown in FIG. 3, the processing system 2 includes switching circuits 4 for receiving calls from a calling party and routing those calls to an appropriate called destination, such as a telephone, a voice mail system, or the like. Program execution is provided by a central processing unit (CPU) 6 communicating over a shared bus 8 with a data storage medium 10, along with program memory 12 for use during program execution. As is known, a high speed memory bus 14 can be placed between the CPU 6 and the program memory 12 to increase program execution speed. Call processing functionality is provided by an object oriented software environment implemented by a software program 16 that runs on the processing system 2. The software program 16 can be created using the Java programming language (including the JavaBean programming tools), or any other suitable programming language, such as C, C++, or the like. In operation, the call center processes each menu-supported call by creating an object to manage the distribution of events, such as those generated when the call is answered, when an announcement is played, when a menu selection is collected, and when a caller hangs up. As each call is processed, multiple threads are generated so that events can be distributed to all recipient objects as quickly as possible. This system of event distribution management is described in more detail below.

Figure 4:
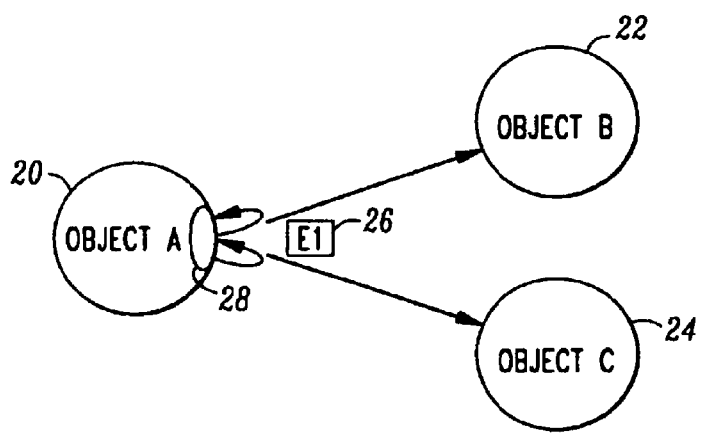
FIG. 4 is a block diagram showing an event notifier object queuing an event from an event generator object before allowing listening objects to execute it in the data processing system of FIG. 3.

Turning now to FIG. 4, an overview of the event processing and distribution functions of the data processing system 2 are shown wherein the software program 16, by way of example only, creates processing objects A, B and C, referenced by numerals 20, 22 and 24, respectively. Object A is the event generator and objects B and C are the event listeners. Object A is shown to generate event E1, referenced by numeral 26, and further has event processing and distribution functionality 28 logically associated with it. Before the listener objects B and C can receive and execute event E1, the event processing and distribution functionality 28 "queues" the event for distribution. Furthermore, the event processing and distribution functionality 28 ensures that the event generator object A will be executable at the same time the listener objects B and C are executable. Because the processing of event E1 is handled on separate stacks for each of the listening objects B and C, the stack space is reclaimed once the processing is complete in object B or C.

Figure 5:
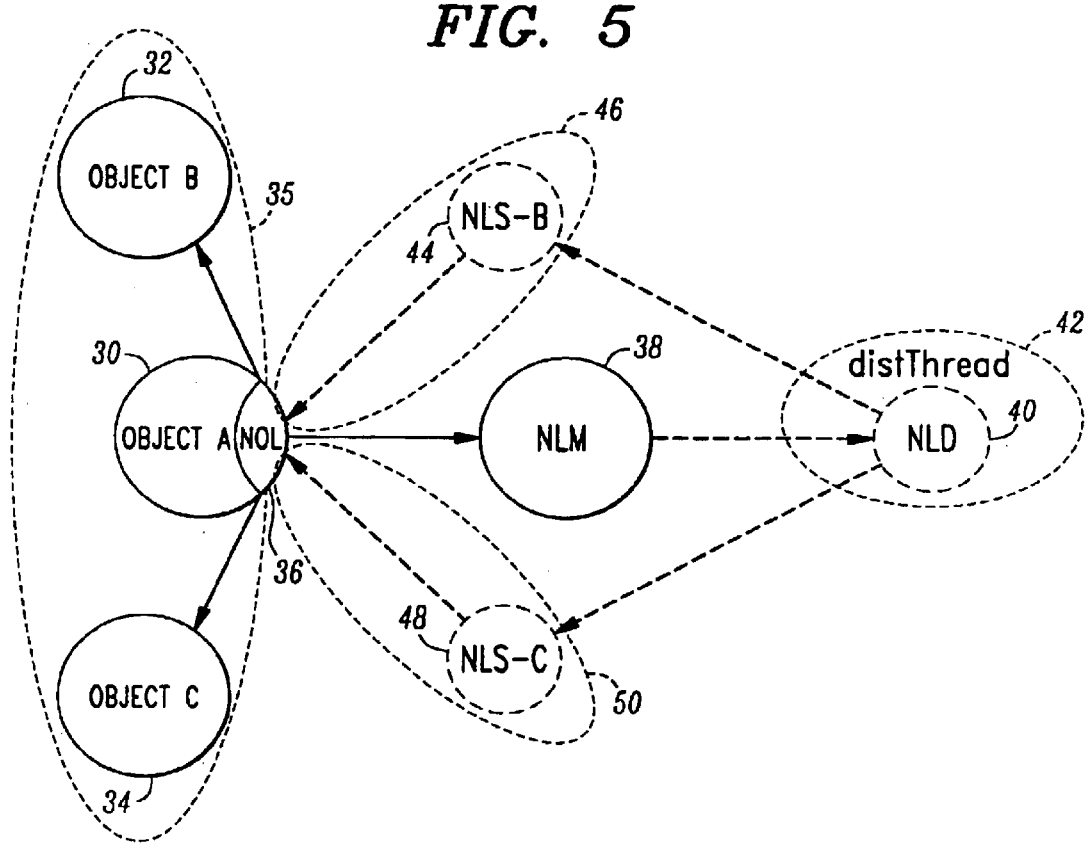
FIG. 5 is a block diagram showing an event being distributed among multiple objects along with the corresponding threads generated in the data processing system of FIG. 3.

Turning now to FIG. 5, the details of the event processing and distribution functionality 28 are shown in accordance with a preferred embodiment of the invention. In this example, which is specifically implemented using the Java programming language, an event generator object (A), referenced by numeral 30, generates events to event listener objects (B) and (C), referenced by numerals 32 and 34, respectively. Event generator object 30 and event listener objects 32 and 34 run on a common thread 35. The event generator object 30 implements a NotifierOfListener (NOL) interface 36 using the Java "interface" construct. The event generator object 30 also creates a NotifyListenerManager (NLM) object 38 to register and deregister event listeners, and to manage event calls. The NLM 38 responds to an event being generated by the event generator object 30 by creating a NotifyListenerDistributor (NLD) object 40 for the event in a separate thread of execution, and then passing the event to the NLD 40 along with a list of event listeners. The NLD 40 runs on the separate thread 42 (distThread) while preferably creating a NotifyListenerSlave (NLS) for each listener on the list it received from the NLM 38. As shown in FIG. 5, the NLD 40 creates NotifyListenerSlave (NLS) objects 44 (NLS-B) and 48 (NLS-C) for listener objects 32 and 34, respectively. The NLS objects 44 and 48 run on separate threads 46 and 50, respectively. Preferably, the priority of the threads 46 and 50 is equal to the priority of the thread 35 and less than that of the thread 42, such that the NLD 40 completes its processing functions before the NLS objects commence processing. The NLS objects 44 and 48 call back to the event generator object 30 and, in each case, pass it the corresponding listener object and event object. The event generator object 30, through a method in the NOL interface 36, then passes the event objects to the listener objects 32 and 34. Because the event generator object 30 passes the event objects in separate threads of execution, the event generator object 30 is free to continue processing in its original thread 35. The management and distribution of events is discussed further below in connection with FIGS. 6 and 7.

Figure 6:
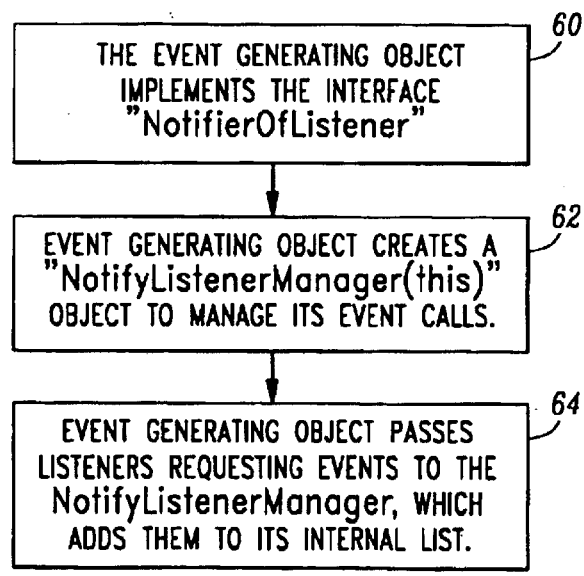
FIG. 6 is a flow diagram showing method steps performed in accordance with the invention to implement the portion of the event distribution scheme of FIG. 5 that corresponds to initialization actions that occur before a specific event is generated.

Turning now to FIG. 6, a flow diagram with the steps involved in implementing the NOL interface 36 and setting up the NLM 38 are shown. The first action taken by the event generator object 30 is to implement the NOL interface 36 in step 60. Next, as shown in step 62, the event generator object 30 creates the NLM 38. is Then, in step 64, as objects request to be registered as event listeners, the event generator object 30 calls the NLM 38 to add the requesting objects to a list of event listeners.

The NOL interface 36 as described in step 60 may be coded in Java in the following way:

```
public interface NotifierOfListener
{
    public void notifyOneListener(EventListener el, EventObject ev) ;
```

In accordance with the Java programming language specifications, the single method "notifyOneListener( )" is not defined in the NotifierOfListener interface itself. Rather, the method is defined in the class definition for the class that implements the interface, which in this case is the class that defines the event generator object 30. Thus, assume there is a "Call" class of which event generator object 30 is a member. The class definition for the Call class would define the notifyOneListener( ) method that will be used for all Call class members, as follows:

```
public class Call implements NotifierOfListener
    {
        public void notifyOneListener(EventListener el, EventObject ev)
        {
            ....
        }
```

To be entirely general, the implementation of a "notifyOneListener( )" method should:
1. include a call to the "super( )" class of the interface-implementing class (using the "super" keyword) in case the user has extended another object which has its own events; and
2. check the type of the EventListener object to make sure that it is the expected type.

If it is not, assume that one of the super classes will handle it.
A sample framework for the notifyOneListener( ) method is as follows:

```
    public class Call implements NotifierOfListener
    {
        public void notifyOneListener( {X} EventListener el,
        {X} EventObject ev)
        {
            super.notifyOneListener(el, ev) ;
            if (el instanceof {X} EventListener)
            {
                // Determine which Listener methods to
                // call based on information in "ev".
                ....
            }
        }
    )
```

In a case where a class supports more than one type of listener set of events, the "notifyOneListener( )" method will be handling all of the event notifications for all types of listeners if the NotifyListenerManager mechanism is being used. In this case, the method needs to determine the type of the listener, store it in a reference of the proper type, and then distribute the event:

```
    public class Call implements NotifierOfListener
    {
        public void notifyOneListener(EventListener el,EventObject ev)
        {
            super.notifyOneListener(el,ev) ;
            if (el instanceof {X} EventListener)
```

-continued

```
            {
                {X} EventListener xel = ( {X}
                EventListener)el ;
                {X} EventObject xev = ( {X} EventObject)
                ev ;
                // Determine which Listener methods to call
                // based on information in "xev".
                ....
            }
            else if (el instanceof {Y} EventListener)
            {
                {Y} EventListener yel = ( {Y}
                EventListener)el ;
                {Y} EventObject yev = ( {Y}
                EventObject)ev ;
                // Determine which Listener methods to
                // call based on information in "yev".
                ....
            }
            ....
        }
    }
```

Note that the listeners must themselves create interfaces that contain the methods called by the event generator object 30's NOL interface 36. A sample listener interface for the "Call" example above may be coded in Java in the following way for an event listener that is assumed to be interested in receiving five events known as "pickup," "announce," "promptAndCollect," "callRoute," and "hangUp."

```
public interface CallListener extends java.util.EventListener
    {
        public abstract void pickup(CallEvent ev) ;
        public abstract void announce(CallEvent ev) ;
        public abstract void promptAndCollect(CallEvent ev) ;
        public abstract void callRoute(CallEvent ev) ;
        public abstract void hangUp(CallEvent ev) ;
    } ;
```

As described relative to steps 62 and 64 above, after the event generator object 30 implements the NOL interface 36, it creates the NLM 38. The event generator object 30 also provides public methods that allow objects to register and deregister themselves as event listeners. These methods, in turn, call upon NLM 38 to add the requesting object to, or remove it from, the NLM's list of listeners. Using the Call class example described above, the methods used to create the NLM 38 (called "manager"), and to add and remove listeners from the NLM listener list may be programmed as follows:

```
public class Call implements NotifierOfListener
    {
        public void notifyOneListener(EventListener el,EventObject ev)
        {
            ....
        }
        private NotifyListenerManager manager =
                new NotifyListenerManager(this) ;
        public void addListener(CallListener el)
        {
            manager.addListener(el) ;
        }
        public void removeListener(CallListener el)
        {
            manager.removeListener(el) ;
        }
```

Figure 7:
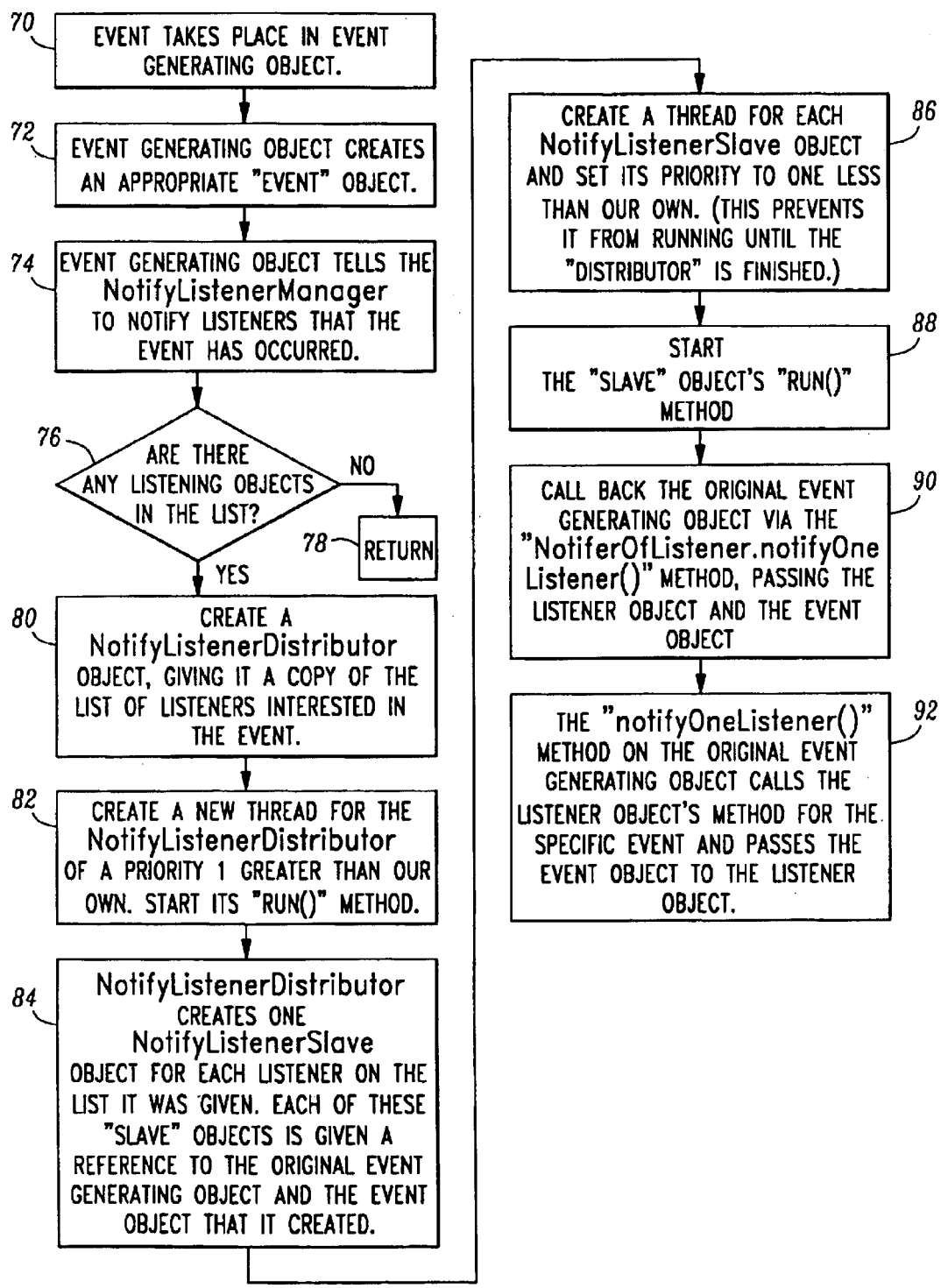
FIG. 7 is a flow diagram showing method steps performed in accordance with the invention to implement the portion of the event distribution scheme of FIG. 5 that corresponds to the generation of an event and the subsequent actions.

Turning now to FIG. 7, a flow diagram for the processing and distribution of events is shown. The actions begin with the occurrence of an event in the event generator object 30 in step 70. The event generator object 30 creates a corresponding event object, such as the event E1 (see FIG. 4), in step 72. The event generator object 30 then tells the NLM 38 to notify any relevant listeners that the event has occurred in step 74. In step 76, the NLM 38 checks its internal listener list to determine if it contains any listening objects for the event. If no such listening objects are on the list, the method returns immediately in step 78. If there are such listening objects, a NotifyListenerDistributor object (such as the NLD 40) is created and given a copy of the list of listeners in step 80.

To implement step 74, the event generator object 30 utilizes a private notifyListener( ) method that calls upon the NLM 38 to distribute the event. Using the Call class example above, the class definition, with the "notifyListener( )" method added thereto, now reads as follows:

```
public class Call implements NotifierOfListener
{
        public void notifyOneListener(EventListener el,
        EventObject ev)
        {
                . . . .
        }
        private NotifyListenerManager manager =
                new NotifyListenerManager(this) ;
        public void addListener(CallListener el)
        {
                manager.addListener(el) ;
        }
        public void removeListener(CallListener el)
        {
                manager.removeListener(el) ;
        }
// "notifyListener()" is private because it is used only internally.
        private void notifyListener(CallEvent ev)
        {
                manager.notifyListeners(ev) ;
        }
}
```

The NLM 38 itself, and the methods that perform steps 64 (event listener registration, deregistration), 74 (notify listeners), 76 (listener list check), and 80 (create NLD), can be defined using the following code, representing the class definition for the NLM 38:

```
public class NotifyListenerManager
{
        private Vector listenerList = new Vector() ;
        private NotifierOfListener parent = null ;
        private String name = null ;
        private static int traceNotifierFlag = 0 ;
        private static int traceNotifierStackFlag = 0 ;
        public NotifyListenerManager(NotifierOfListener owner)
        {
                parent = owner ;
                name = Identity.id(owner) ;
        }
        public synchronized void addListener(EventListener 1)
        {
                if (1 != null)
                        listenerList.addElement(1) ;
        }
        public boolean containsListener(EventListener el)
        {
```

-continued

```
                return(listenerList.contains(el)) ;
        }
        public Object[ ] getListeners()
        {
                int sz = listenerList.size() ;
                if (sz == 0)
                        return(null) ;
                Object[ ] arr = new   Object[sz] ;
                listenerList.copyInto ((Object[ ] )arr) ;
                return(arr) ;
        }
        public int getSize()
        {
                return(listenerList.size()) ;
        }
        public void notifyListeners(Eventobject ev)
        {
                Vector copyList = null ;
                synchronized (listenerList)
                {
                        copyList = (Vector)listenerList.clone() ;
                }
// If there are any listeners, create a distributor Thread so that the
// current Thread is not blocked by the listener, and so if there are
// multiple listeners, they do not block each other.
                if (copyList.size() > 0)
                {
                        NotifyListenerDistributor dist =
                                new NotifyListenerDistributor(parent,
                                copyList,ev) ;
                        Thread distThread = new Thread(dist) ;
                        distThread.start() ;
                }
        }
        public synchronized void removeListener(EventListener 1)
        {
                if (1 != null)
                        listenerList.removeElement(1) ;
        }
}
```

In step 82 of FIG. 7, a new thread is created for the NLD 40 with a priority level that is one greater than the thread priority for the event generator object 30, and NLD 40's run( ) method is started. For each listener on the listener list given to the NLD 40, one of the NLS objects (e.g., NLS 44 and 48) is created in step 84. Also in step 84, the NLS objects are given a reference to the original event generator object 30 and the event object that it created. For each NLS object, a thread is created in step 86 with a priority level one less than the current object's priority. Because of the lower priority level, the NLS objects do not run until the NLD 40 is finished distributing events. Each NLS object's run( ) method is started in step 88.

The generation of the thread for the NLD 40, the NLS objects, and the NLS object threads, as well as the starting of the NLS object run( ) methods, as described above relative to steps 82 (new NLD thread), 84 (new NLS objects), 86 (new NLS threads) and 88 (NLS run), may be implemented by the following Java code, representing the class definition for the NLD 40:

```
// This class is used ONLY by NotifyListenerManager objects
// to distribute listener notifications.
import java.util.* ;
public class NotifyListenerDistributor implements Runnable
{
        private NotifierOfListener parent = null ;
        private Vector listenerList = null ;
        private EventObject event = null ;
```

-continued

```
NotifyListenerDistributor(NotifierOfListener owner, Vector list,
        EventObject ev)
{
    parent = owner ;
    // No copy need be made because this is already
    // a copy made by the NotifyListenerManager that
    // created this object.
    listenerList = list ;
    event = ev ;
}
public void run()
{
    // Increase priority on this Thread by one so that
    // it takes priority over all of the children that it
    // spawns and the parent that spawned it.
    Thread thread = Thread.currentThread() ;
    int slavePriority = thread.getPriority() ;
    thread.setPriority(slavePriority+1) ;
    Enumeration e = listenerList.elements() ;
    EventListener el = null ;
    NotifyListenerSlave slave = null ;
    Thread slaveThread = null ;
    while (e.hasMoreElements())
    {
        el = (EventListener)e.nextElement() ;
        // Create a slave object that will know who its
        // parent is, what the EventListener is and what
        // the EventObject is.
        slave = new NotifyListenerSlave(parent,el,
            event) ;
        slaveThread = new Thread(slave) ;
        // Set the child Thread's priority to the original
        // priority, which is one less than our priority.
        // This means that once start () ed, it will not
        // run until we have created Threads
        // for all of the listeners to be notified.
        slaveThread.setPriority(slavePriority) ;
        // Start the slave object thread, knowing that it
        // will not be allowed to run until the distributor
        // object goes away, since the slave's priority
        // is lower than the "distributor" thread's.
        slaveThread.start() ;
    }
}
}
```

Upon a call back via the notifyOneListener( ) metod of the NOL 36, the listener object and event object are passed to the original event generator object 30 in step 90. Based on the notifyOneListener( ) method steps defined in the class definition for the event generator object 30 (e.g., the Call class), the appropriate listener object methods are called and the event objects is distributed to the event listener objects 32 and 34 in step 92.

The passing of the listerner object and event object to the event generator object 30 using the notyfyOneListener( ) method, as described instep 90, may be implemented by the followingJava code, representing the class definition for NLS objects:

```
public class NotifyListenerSlave implements Runnable
{
    private NotifierOfListener parent = null ;
    private EventListener listener = null ;
    private EventObject event = null ;
    NotifyListenerSlave(NotifierOfListener owner,
            EventListener el,EventObject ev)
    {
        parent = owner ;
        listener = el ;
        event = ev ;
    }
```

-continued

```
    // Notify the single listener we are responsibie for and then
    // return. If the listener does not return for a long time, there is
    // no problem because its execution is isolated in a separate Thread.
    public void run()
    {
        parent.notifyOneListener(listener,event) ;
    }
```

The Java code for the notifyOneListener( ) method implemented in step 92 is shown above in relation to the NOL 36 implemented in step 60 of FIG. 6, and thus will not be repeated here.

Accordingly, a system and method for managing the distribution of events in a data processing system has been described. While various embodiments have been disclosed, it should be apparent that many variations and alternative embodiments could be implemented in accordance with the invention. It is understood, therefore, that the invention is not to be in any way limited except in accordance with the spirit of the appended claims and their equivalents.

What is claimed is:

1. A method for distributing events to at least one event recipient in a data processing system while retaining processing control at the event generator, comprising the steps of:

generating an event at an event generator running in a first execution thread that has a first priority of execution; and distributing, in a second execution thread that is separate from the first execution thread and that has a second priority of execution higher than the first priority, said event to said at least one event recipient running in the first execution thread.

2. A method in accordance with claim 1 wherein said generating step includes implementing an interface to said event generator comprising a listener notification method running in the first execution thread that responds to the distributing by calling listener methods in the first execution thread corresponding to each event distributed to said at least one event recipient.

3. A method in accordance with claim 1 wherein said distributing step includes creating an event manager prior to said generating step to manage event calls.

4. A method in accordance with claim 1 wherein said distributing step includes creating an event distributor following said generating step, said event distributor running in a new thread of execution that is separate from the first execution thread and that has a second priority of execution higher than the first priority.

5. In a multi-threaded data processing system running one or more event generator objects generating events to one or more event listener objects, a method for distributing events from an event generator object to an event listener object without losing processing control at the event generator object, comprising steps of:

creating a NotifyListenerManager for said event generator that is running in a first execution thread that has a first priority of execution;

creating, in response to an event being generated by said event generator object, a NotifyListenerDistributor and assigning said NotifyListenerDistributor to run in a second thread of execution that is separate from the first execution thread and that has a second priority of execution higher than the first priority; and implementing said NotifyListenerDistributor to distribute said event to said event listener object that is running in the first execution thread.

6. The method of claim 5 wherein there are multiple event listener objects and wherein said method further includes:

creating, for each said event listener object, an associated NotifyListenerSlave and assigning each NotifyListenerSlave a new thread of execution that is separate from the first and the second execution threads and that has a third priority of execution lower than the second priority; and implementing each NotifyListenerSlave to distribute said event to said event listener objects.

7. The method of claim 6 wherein said NotifyListenerSlave distributes said event by calling a NotifierOfListener interface, created as part of said event generator object and running in the first execution thread.

8. The method of claim 5 further including:

implementing a NotifierOfListener interface that has a notifyOneListener method to examine event objects and call in the first execution thread a corresponding event method associated with one of said event listener objects; and invoking said NotifyListenerManager to create a list for identifying event listener objects that have requested notification of said event objects.

9. The method of claim 8 wherein said step of creating said NotifyListenerDistributor occurs in response to a determination that at least one event listener object is identified in said list of event listener objects.

10. The method of claim 9 wherein said NotifyListenerDistributor receives a copy of said list of event listener objects from said NotifyListenerManager.

11. The method of claim 6 wherein said new execution thread for said NotifyListenerSlave is assigned the third priority that is equal to the first priority of said first execution thread for said event generator object and less than the second priority of said second execution thread for said NotifyListenerDistributor.

12. The method of claim 7 wherein each NotifyListenerSlave distributes said event by passing the identity of its associated event listener object and said event object by means of a call in the new thread of execution to a notifyOneListener( ) method implemented by said NotifierOfListener interface.

13. A system for distributing events to at least one event recipient in a data processing system while retaining processing control at the event generator, comprising:

means for generating said event at said event generator running in a first execution thread that has a first priority of execution; and means for distributing, in a second execution thread that is separate from the first execution thread and that has a second priority of execution higher than the first priority, said event to said at least one event recipient running in the first execution thread.

14. A system in accordance with claim 13 wherein said means for generating said event includes an implementation of an interface to said event generator comprising a listener notification method running in the first execution thread and that responds to the distribution by calling listener methods in the first execution thread corresponding to each event distributed to said at least one event recipient.

15. A system in accordance with claim 13 wherein said means for distributing said event includes an event manager that manages event calls.

16. A system in accordance with claim 13 wherein said means for distributing said event includes an event distributor running in a new thread of execution that is separate from the first execution thread and that has a second priority of execution higher than the first priority.

17. In a multi-threaded data processing system running one or more event generator objects generating events to one or more event listener objects, a system for distributing events from an event generator object to an event listener object without losing processing control at the event generator object comprising:

a NotifyListenerManager associated with said event generator that is running in a first execution thread that has a first priority of execution;

a NotifyListenerDistributor, created in response to an event being generated by said event generator object and running in a second thread of execution that is separate from the first execution thread and that has a second priority of execution higher than the first priority; and said NotifyListenerDistributor being adapted to distribute said event to said event listener object that is running in the first execution thread.

18. A system in accordance with claim 17 wherein multiple event listener objects exist and wherein said system further includes:

a NotifyListenerSlave, created for each said event listener object and assigned a new thread of execution that is separate from the first and the second execution threads and that has a third priority of execution lower than the second priority; and said NotifyListenerSlave being adapted to distribute said event to said event listener objects.

19. A system in accordance with claim 18 wherein said NotifyListenerSlave is adapted to distribute said event by calling a NotifierOfListener interface, created as part of said event generator object and running in the first execution thread.

20. A system in accordance with claim 18 wherein said new execution thread for said NotifyListenerSlave has the third priority that is equal to the first priority of said first execution thread for said event generator object and less than the second priority of said second execution thread for said NotifyListenerDistributor.

21. A system in accordance with claim 19 wherein said NotifyListenerSlave is adapted to distribute said event by passing the identity of said event listener object and said event object by calling in the new thread of execution a notifyOneListener( ) method implemented by said NotifierOfListener interface.

22. A method of distributing an event from a generator of the event to a recipient of the event, comprising:

creating an event manager object for registering any recipients of the event, including the recipient;

creating an object-notification interface to an object that is the generator of the event;

generating the event at the object that is the generator and that is running in a first execution thread that has a first priority of execution;

in response to the generating, creating an event-distribution object that is running in a second execution thread separate from the first execution thread and that has a second priority of execution higher than the first priority;

passing the event and a list of said any recipients of the event to the event-distribution object;

the event distribution object passing the event in the second execution thread to the object-notification interface of the object that is the generator of the event; and the object-notification interface passing the event to an object that is the recipient and that is running in the first execution thread.

23. The method of claim 22 wherein:

creating an event-distribution object comprises in response to the generating, the object-notification interface passing the event to the event manager, and in response to the object-notification interface passing the event, the event manager creating the event-distribution object; and passing the event and a list of said any recipients comprises the event manager passing the event and the list of recipients to the event-distribution object.

24. The method of claim 22 for distributing the event to a plurality of recipients of the event, wherein:

the event-distribution object passing the event comprises the event-distribution object creating a plurality of listener objects each corresponding to a different one of the plurality of the recipients, each listener object running in a third execution thread having a third priority of execution lower than the second priority, the event-distribution object passing the event to the listener objects, and each listener object passing the event in the third execution thread to the object-notification interface of the object that is the generator of the event; and the object-notification interface passing the event comprises in response to each passing of the event from one of the listener objects, the object-notification interface passing the event to an object that is the corresponding recipient and that is running in the first execution thread.

25. The method of claim 22 wherein:

creating an event-distribution object comprises in response to the generating, the object-notification interface passing the event to the event manager, and in response to the object-notification interface passing the event, the event manager creating the event-distribution object; and passing the event and a list of said any recipients comprises the event manager passing the event and the list of recipients to the event-distribution object.

26. An apparatus for distributing an event from a generator of the event to a recipient of the event, comprising:

means for creating an event manager object for registering any recipients of the event, including the recipient;

means for creating an object-notification interface to an object that is the generator of the event;

means for generating the event at the object that is the generator and that is running in a first execution thread that has a first priority of execution;

means responsive to the generating, for creating an event-distribution object that is running in a second execution thread separate from the first execution thread and that has a second priority of execution higher than the first priority;

means for passing the event and a list of said any recipients of the event to the event-distribution object;

means in the event-distribution object for passing the event in the second execution thread to the object-notification interface of the object that is the generator of the event; and means in the object-notification interface for passing the event to an object that is the recipient and that is running in the first execution thread.

27. The apparatus of claim 26 wherein:

the means for creating an event-distribution object comprises means in the object-notification interface, responsive to the generating, for passing the event to the event manager, and means in the event manager, responsive to the object-notification interface passing the event, for creating the event-distribution object; and the means for passing the event and a list of said any recipients comprises means in the event manager, for passing the event and the list of recipients to the event-distribution object.

28. The apparatus of claim 26 for distributing the event to a plurality of recipients of the event, wherein:

the means in the event-distribution object for passing the event comprises means in the event-distribution object, for creating a plurality of listener objects each corresponding to a different one of the plurality of the recipients, each listener object running in a third execution thread having a third priority of execution lower than the second priority, means in the event-distribution object, for passing the event to the listener objects, and means in each listener object, for passing the event in the third execution thread to the object-notification interface of the object that is the generator of the event; and the means in the object-notification interface for passing the event comprises means in the object-notification interface, responsive to each passing of the event from one of the listener objects, for passing the event to an object that is the corresponding recipient and that is running in the first execution thread.

29. The apparatus of claim 28 wherein:

the means for creating an event-distribution object comprises means in the object-notification interface, responsive to the generating, for passing the event to the event manager, and means in the event manager, responsive to the object-notification interface passing the event, for creating the event-distribution object; and the means for passing the event and a list of said any recipients comprises means in the event manager, for passing the event and the list of recipients to the event-distribution object.

* * * * *